United States Patent
Conklin et al.

(10) Patent No.: US 7,461,241 B2
(45) Date of Patent: Dec. 2, 2008

(54) CONCURRENT PHYSICAL PROCESSOR REASSIGNMENT METHOD

(75) Inventors: Christopher R. Conklin, Kingston, NY (US); Randall W. Philley, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 11/461,153

(22) Filed: Jul. 31, 2006

(65) Prior Publication Data

US 2008/0028413 A1 Jan. 31, 2008

(51) Int. Cl.
*G06F 15/16* (2006.01)
(52) U.S. Cl. ...................................... 712/220
(58) Field of Classification Search ................. 712/220; 718/104, 105
See application file for complete search history.

(56) References Cited

U.S. PATENT DOCUMENTS

| | | | |
|---|---|---|---|
| 5,504,859 A | 4/1996 | Gustafson et al. | 395/182.09 |
| 6,189,112 B1 | 2/2001 | Slegel et al. | 714/10 |
| 6,199,179 B1 | 3/2001 | Kauffman et al. | 714/26 |
| 6,292,822 B1 * | 9/2001 | Hardwick | 718/105 |
| 6,519,660 B1 * | 2/2003 | Rooney | 710/38 |
| 6,574,748 B1 | 6/2003 | Andress et al. | 714/11 |
| 2004/0168170 A1 * | 8/2004 | MIller | 718/104 |
| 2004/0215939 A1 * | 10/2004 | Armstrong et al. | 712/220 |
| 2004/0216101 A1 * | 10/2004 | Burky et al. | 718/100 |
| 2004/0221193 A1 | 11/2004 | Armstrong et al. | 714/10 |
| 2005/0172292 A1 * | 8/2005 | Yamada et al. | 718/105 |
| 2005/0172293 A1 * | 8/2005 | Petruncola et al. | 718/105 |
| 2005/0210469 A1 * | 9/2005 | Chung et al. | 718/100 |

* cited by examiner

*Primary Examiner*—Eric Coleman
(74) *Attorney, Agent, or Firm*—Geraldine D. Monteleone, Esq.; Blanche E. Schiller, Esq.; Heslin Rothenberg Farley & Mesiti P.C.

(57) ABSTRACT

Reassignment of a physical processor backing a logical processor is performed concurrently to the operation of the processor. The operating state of one physical processor is loaded on another physical processor, such that the logical processor is backed by a different physical processor. This reassignment is performed concurrent to processor operation and transparent to the operating system.

9 Claims, 7 Drawing Sheets

CONCURRENT PHYSICAL PROCESSOR REASSIGNMENT METHOD

TECHNICAL FIELD

This invention relates, in general, to processing within a processing environment, and in particular, to concurrent reassignment of physical processors backing logical processors of the processing environment.

BACKGROUND OF THE INVENTION

An operating system views a processor as a logical processor. This logical processor is backed by a certain physical processor. The physical assignment of processors is determined when the machine is powered on and initialized before the operating system is loaded. Normally, once the assignment of logical to physical processor is made, this assignment is not modified.

However, under certain stringent conditions, the assignment of logical to physical processor can be modified. In particular, if a processor fails, the assignment can be modified, assuming a spare processor exists within the processing environment. Specifically, in situations of failed processors, the assignment is modified, such that the spare processor, instead of the failed processor, backs the logical processor.

SUMMARY OF THE INVENTION

Although assignment modification is available for failed processors, a need exists for an improved capability for reassigning the physical backing of logical processors. In one example, a capability is needed for physical processor reassignment for operating processors. For instance, a need exists for a physical processor reassignment capability that is performed concurrent to operation of the physical processor backing the logical processor. Further, a need exists for a reassignment capability that is performed transparently and without the overhead of using operating system software.

The shortcomings of the prior art are overcome and additional advantages are provided through the provision of a method of reassigning physical processors of a processing environment. The method includes, for instance, determining that a physical processor backing a logical processor is to be changed; and reassigning to the logical processor another physical processor, wherein the reassigning is concurrent to operation of the physical processor.

System and computer program products corresponding to the above-summarized method are also described herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, the physical backing of one or more logical processors of a processing environment is changed. For example, a physical processor currently assigned to a logical processor (a source processor) is replaced by another physical processor (a target processor). This reassignment of the another physical processor to the logical processor is performed while the physical processor initially backing the logical processor (i.e., the source processor) is operating (as opposed to failed, check-stopped or clock-stopped), and transparent to and without the involvement of operating system software, including a logical partition hypervisor. Reassignment may be concurrently performed for one or more logical processors.

Figure 1:
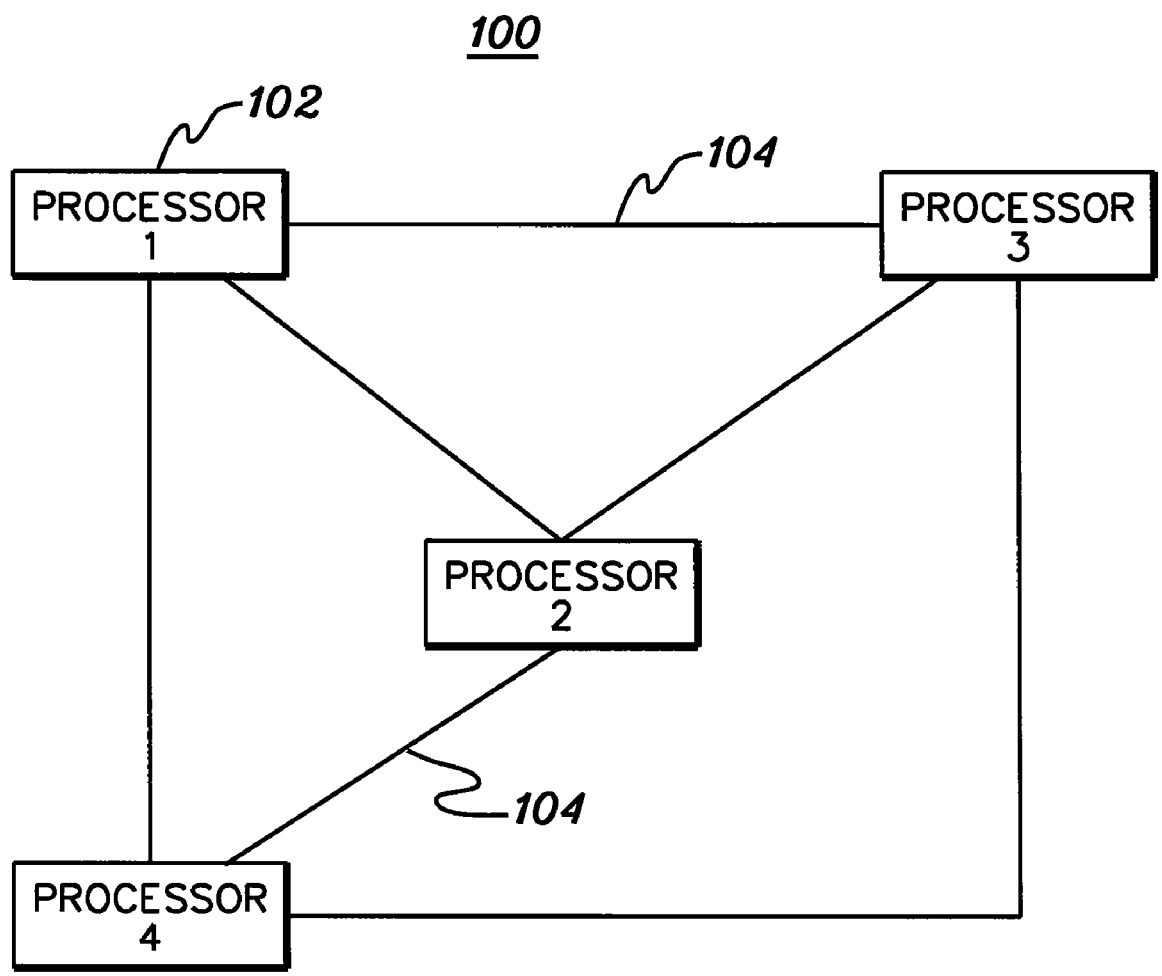
FIG. 1 depicts one embodiment of a processing environment to incorporate and use one or more aspects of the present invention.

One or more aspects of the present invention are utilized in various types of processing environments. One embodiment of a processing environment to incorporate and use one or more aspects of the present invention is described with reference to FIG. 1. A processing environment 100 includes a plurality of processors 102 coupled to one another via one or more connections 104. Each processor in this example is a zSeries® server executing a z/OS® operating system, offered by International Business Machines Corporation (IBM®). Connection 104 is, for instance, a token ring, network connection, cable, or any other type of connection. IBM®, zSeries® and z/OS® are registered trademarks of International Business Machines Corporation, Armonk, N.Y., U.S.A. Other names used herein may be registered trademarks, trademarks or product names of International Business Machines Corporation or other companies.

Each processor 102 is viewed as a logical processor to its operating system. This logical processor, however, is backed by a physical processor assigned thereto. The physical assignment of processors is made, for instance, by the firmware (e.g., millicode) of the environment based on processor type (i.e., CPU, SAP) and/or machine configuration (e.g., layout of physical processors, number of books), etc.

There are times when it is necessary or desirable to reassign the physical backing of one or more logical processors. That is, there are times when it is desirable to change the physical backing of one or more logical processors. As examples, assignment modification is beneficial during a book replacement operation and/or a processor upgrade. During a book replacement operation, a book is targeted to be removed from the system. If the operating system is utilizing one or more processors that are physically located on the book that is targeted to be removed, then as part of the evacuation, the logical processor is moved to a processor that is physically located on another book remaining in the system. Similarly, when a processor upgrade occurs, new processor resources are allocated. The new processor resources take the place of spare processors and the spare processors' physical locations may not be optimal depending on the existing configuration. Thus, the currently allocated physical processor resources are reallocated.

One embodiment of the logic associated with physical processor reassignment is described with reference to FIG. 2. In one example, this logic is performed in millicode of one or more of the processors of the processing environment.

Figure 2:
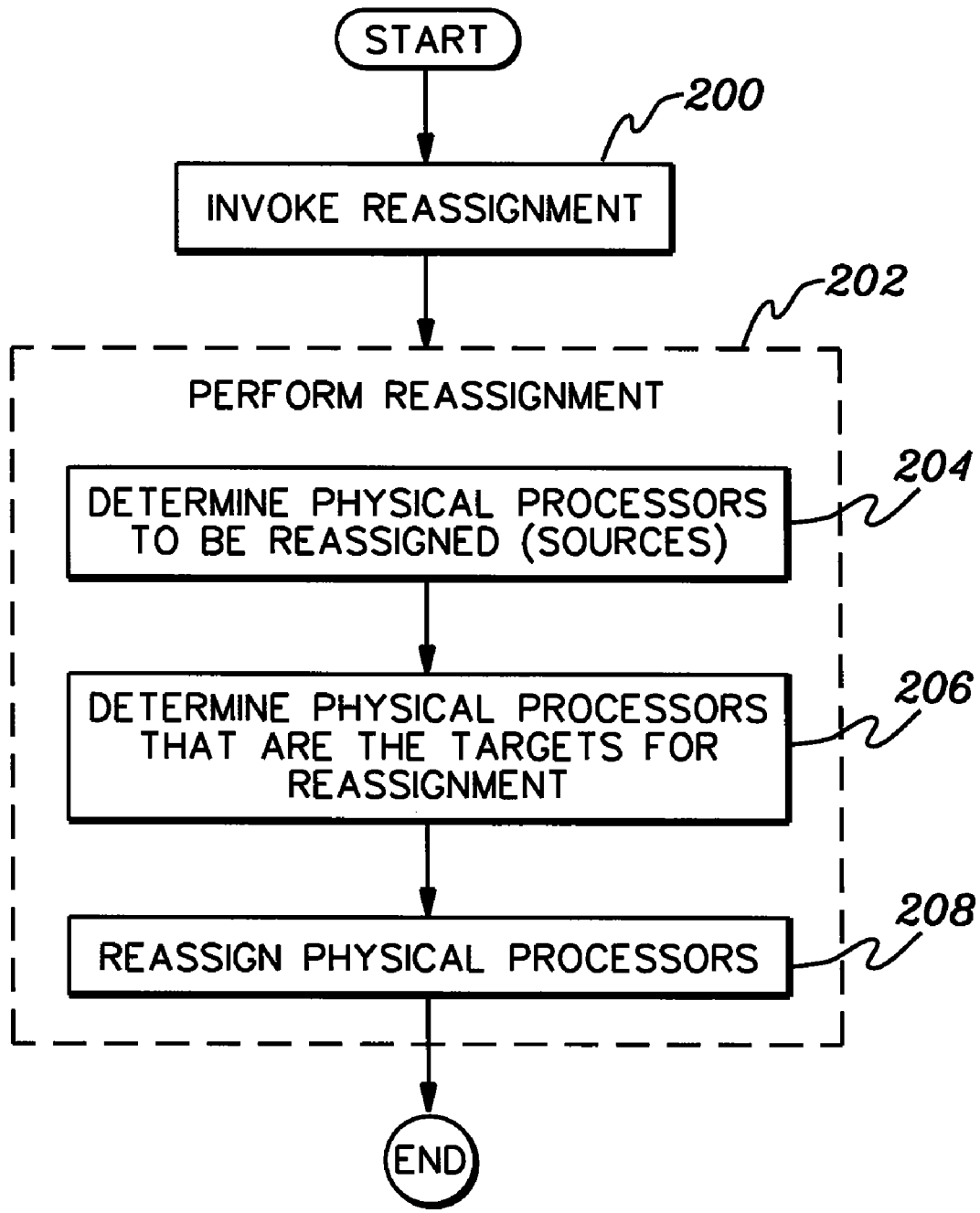
FIG. 2 depicts one embodiment of the logic associated with performing concurrent physical processor reassignment, in accordance with an aspect of the present invention.

With reference to FIG. 2, initially, reassignment is invoked, STEP 200. Reassignment may be invoked for a number of different reasons, including, for instance, reallocating the resources of a processing environment or performing a concurrent book replacement operation. Other reasons for reassignment also exist. In one embodiment, a reassignment indication is received on all of the processors of the processing environment. In another embodiment, the reassignment indication is received on a subset of the processors.

In response to invoking reassignment, reassignment is performed on each of one or more of the processors, STEP 202. To perform the reassignment, a determination is made as to the one or more physical processors to be reassigned (i.e., one or more sources are determined), STEP 204. Further, a determination is made as to the physical processors that are the targets for the reassignment, STEP 206. A particular physical processor may be both a target and a source. For instance, if a swap is to take place (e.g., iPU1/pPU1, iPU2/pPU2→iPU2/pPU1, iPU1/pPU2), then the processors of the swap are both sources and targets.

Subsequent to making these determinations, the reassignment occurs, STEP 208. This includes storing the operating state of a source physical processor on a target physical processor. For instance, in the above swap example, the operating state of physical processor 2 is reassigned to physical processor 1, and the operating state of physical processor 1 is reassigned to physical processor 2.

Figure 3:
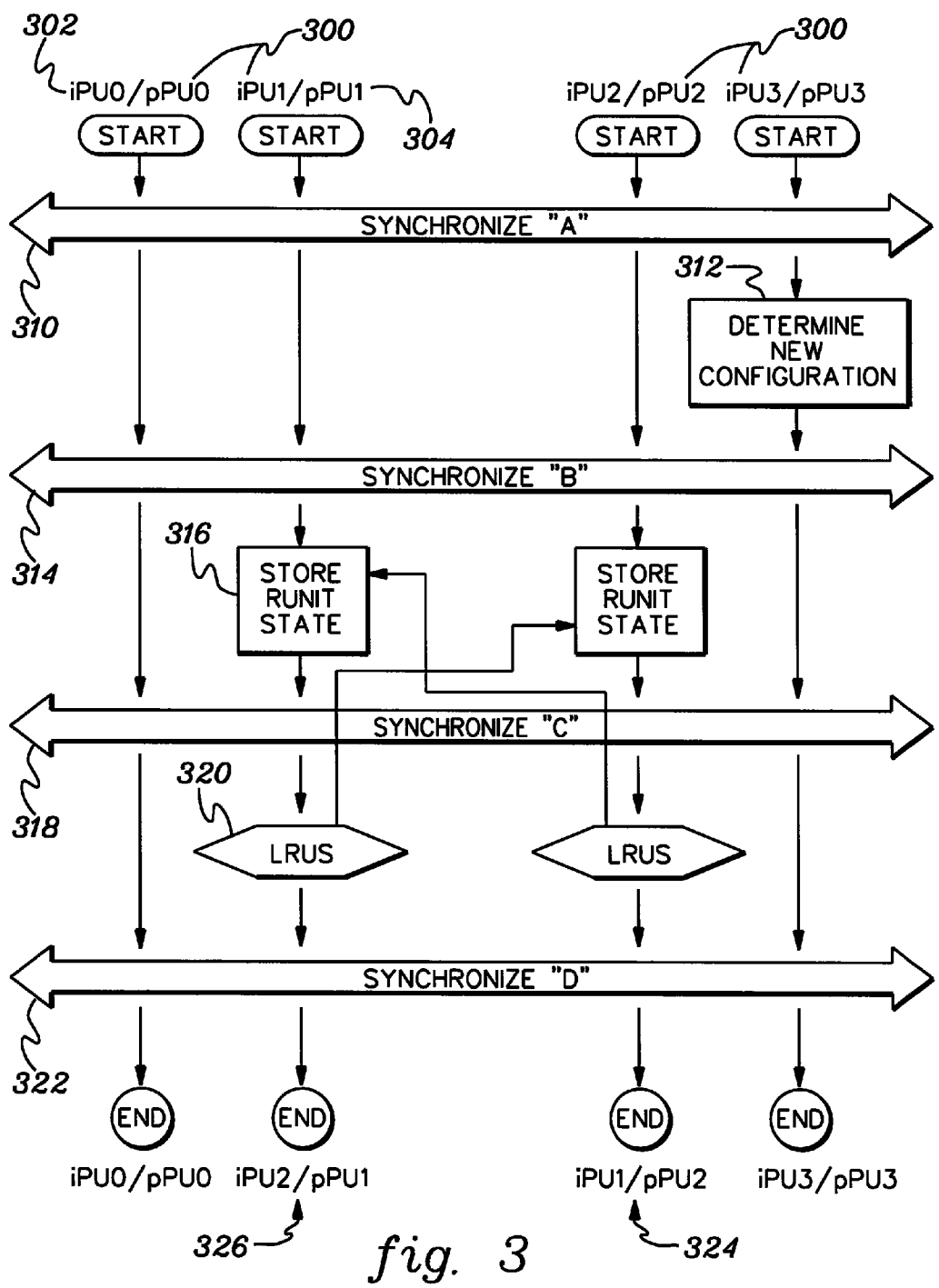
FIG. 3 depicts further details associated with one embodiment of performing concurrent physical processor reassignment, in accordance with an aspect of the present invention.
Figure 4:
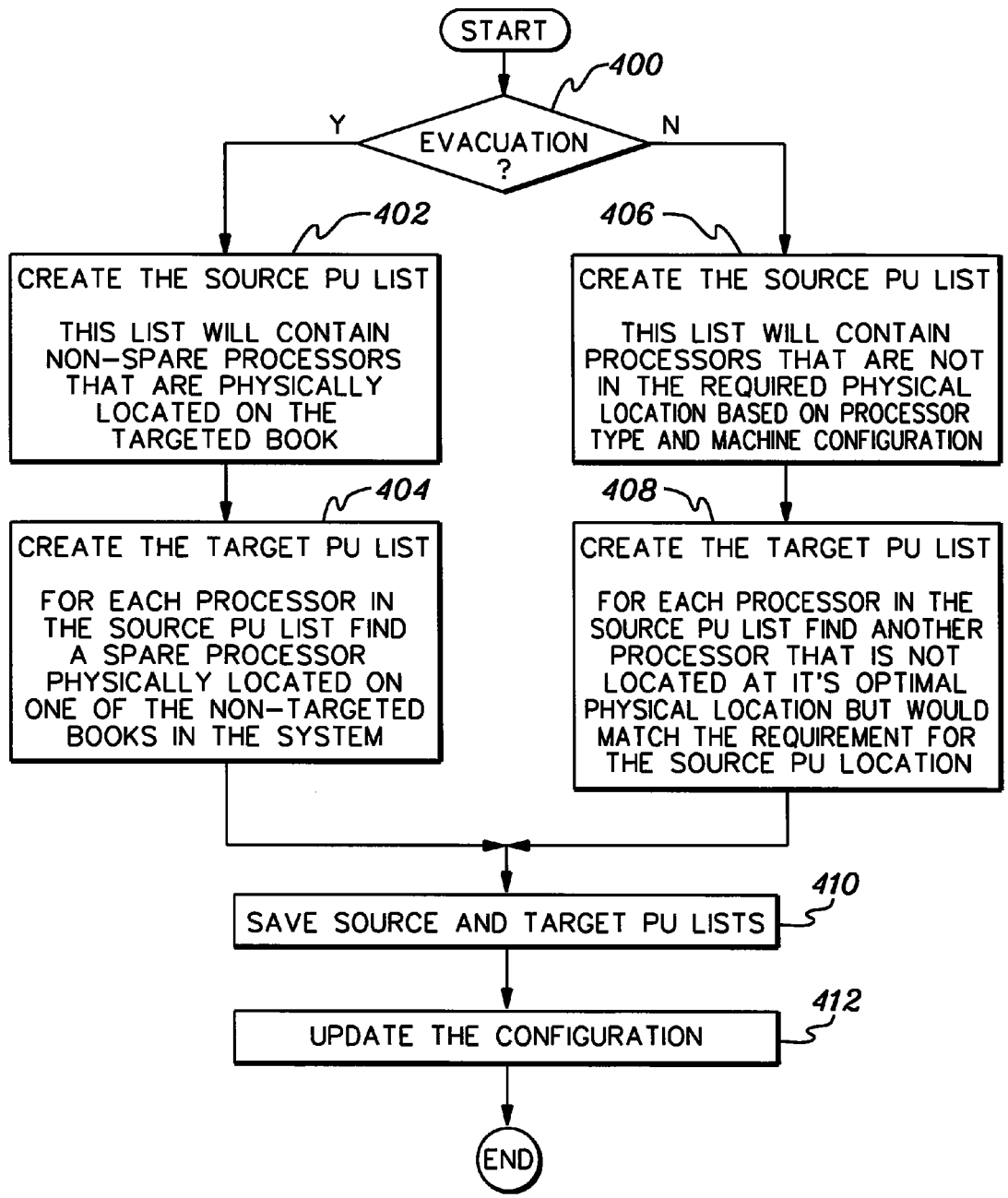
FIG. 4 depicts one embodiment of the logic associated with determining a new configuration used during concurrent physical processor reassignment, in accordance with an aspect of the present invention.
Figure 5:
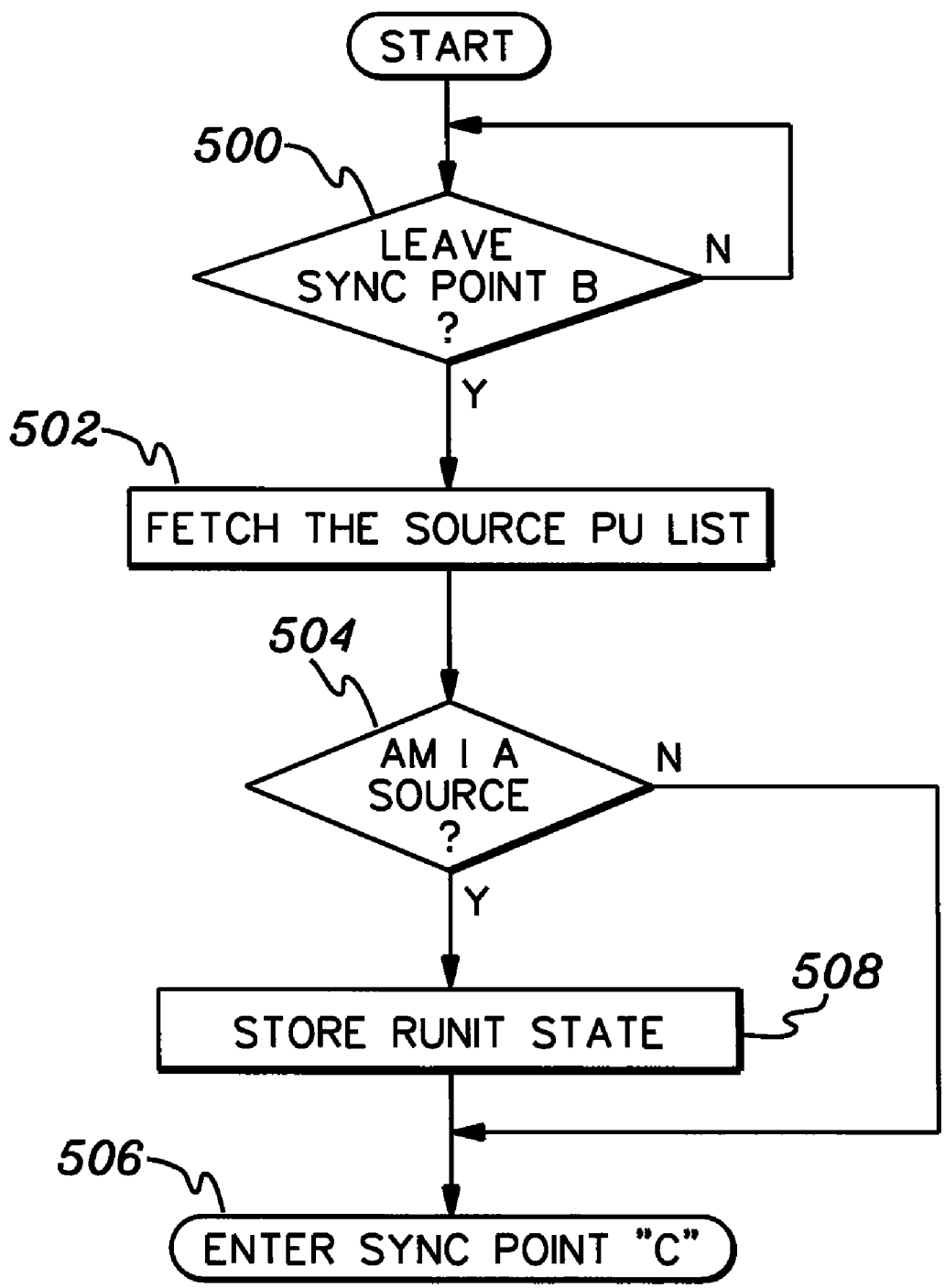
FIG. 5 depicts one embodiment of the logic associated with storing the operating state of a source processor to be reassigned, in accordance with an aspect of the present invention.
Figure 6:
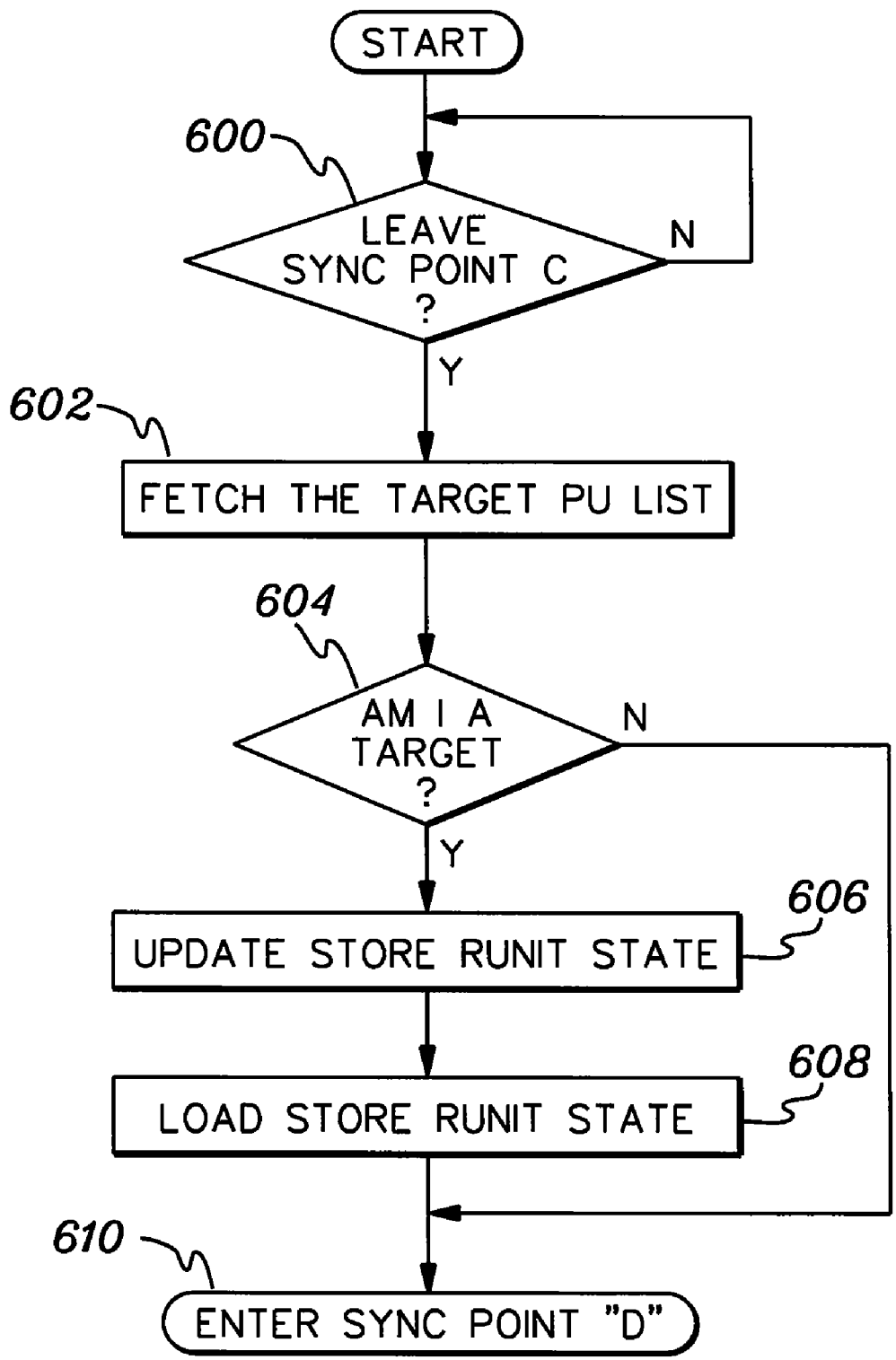
FIG. 6 depicts one embodiment of the logic associated with loading the stored operating state at a target processor, in accordance with an aspect of the present invention.

Further details regarding concurrent reassignment of physical processors are described with reference to FIGS. 3-6. In particular, FIG. 3 depicts one embodiment of the logic associated with concurrent physical processor reassignment in a processing environment that includes four processors; FIG. 4 depicts one embodiment of the logic associated with determining a new configuration used in the reassignment; FIG. 5 depicts one embodiment of the logic associated with storing the state of a source processor; and FIG. 6 depicts one embodiment of the logic associated with loading the stored state at a target processor.

Referring to FIG. 3, there are four processors 300, each designated by a logical processor identifier (iPUx) 302 and a physical processor identifier (pPUx) 304. At some point in time, the concurrent physical processor reassignment technique is invoked on the processors. As one example, reassignment is invoked by executing an instruction on each of the operating processors of the environment (or a subset of processors, in another embodiment). The instruction includes, for instance, an opcode designating the operation to be performed, and an address stored in a register that identifies the address of a parameter block used to control the operation. The parameter block includes a number of fields, such as: an evacuation field indicating whether the reassignment is part of an evacuation; a rebalance field indicating whether the reassignment is part of a rebalance function; a spare field indicating whether a spare processor can be in the same book; a book number indicating the number of the book for the evacuation function; a return code; and old configuration data, which provides a record for tracking and debugging, and includes, for instance, configuration data at the beginning of a process (e.g., oper-PPU, oper-CPU, oper-SAP, etc.), vectors describing the type of processor per physical PU number, physical to logical PU mapping, and processor information per logical PU (e.g., type, state, physical PU id).

In response to invoking the instruction on the processors, reassignment is performed by processor firmware (e.g., millicode) executing as a result of the invocation in firmware of the instruction. As one example, in response to executing the instruction, the processors of the processing environment are synchronized, STEP 310. Synchronization is for all processors, in this example, including spare processors. Additionally, a single processor is chosen as a master processor. This selection may be random or based on some predefined criteria. In this example, Processor 3 is chosen as the master. The master is responsible for alerting any spare processors in the system to synchronize and is also responsible for controlling the flow of the process.

In response to reaching synchronization of all the operating processors in the environment, the master determines a new configuration for the processing environment, STEP 312. This new configuration is determined based on the requirements of the processing environment and the reason for the invocation (e.g., book evacuation, processor redistribution, etc.), as examples. As part of this determination, the master determines the one or more physical processors that are to be reassigned (sources), and the one or more physical processors that are to be the targets for the sources, which is described in further detail below. Subsequent to making this determination, the master updates global structures within the processing environment (e.g., Hardware System Area storage locations) that describe the changes to the physical processor assignments. For example, the global structures indicate which physical processor is reassigned to a particular logical processor. At this point, each of the processors returns to a synchronization point, STEP 314.

Thereafter, the master triggers the processors to leave the synchronization state and inspect the new physical processor assignments. Physical processors that were chosen by the master to be reassigned store their micro-architected state in the designated storage, STEP 316, and return to a synchronization point, STEP 318. The micro-architected state is the operating state of the physical processors. It includes processor checkpointed state information, including, for instance, contents of general registers, access registers, floating point registers, control registers, timing facility registers, system configuration registers, instruction address registers, etc. Processors that were not chosen to be reassigned return to the synchronization point, STEP 318.

Thereafter, the master triggers the processors to leave the synchronization state and again inspect the new physical processor assignments. Physical processors that were chosen by the master to be targets load the micro-architected state of the corresponding source physical processor, STEP 320, as described below, and return to synchronization, STEP 322. Processors that were not chosen to be targets also return to a synchronization point, STEP 322.

In response to the processors returning to the synchronization point, the operation is complete and the master triggers the processors to end the reassignment procedure. As a result of reassignment, in this embodiment, Logical Processor 1 (iPU1) is now backed by Physical Processor 2 (see reference number 324), and Logical Processor 2 (iPU2) is now backed by Physical Processor 1 (see reference number 326).

Further details regarding the reassignment process are described below. For example, one embodiment of the logic associated with the determining of the new configuration (STEP 312) is described with reference to FIG. 4. As described above, this logic is executed on the master processor in response to the processors in the system reaching a synchronization point.

Referring to FIG. 4, a determination is made as to whether the reassignment is being performed because of an evacuation, INQUIRY 400. The reason for the reassignment is indicated by the instruction invoking reassignment. If the reassignment is being performed because of an evacuation, then a source processor list is created that includes the non-spare processors that are physically located on the book targeted for removal, STEP 402. Additionally, a target processor list is created that includes for each processor in the source list, a spare processor physically located on one of the books not targeted for removal, STEP 404.

However, if the reassignment is not being performed because of an evacuation, then in this embodiment, it is being performed as part of a concurrent processor upgrade operation. As such, a source processor list is created that includes the processors that are not in the required physical location based on processor type (e.g., CPU, SAP, etc.) and machine configuration (e.g., number of physical processors per book, and number of books in the system), as examples, STEP 406. This is determined, for instance, by a data structure (e.g., table) maintained in internal storage.

In addition to the source list, a target processor list is created, STEP 408, in which for each processor in the source processor list, another processor is found that is not located at its optimal physical location, but would match the requirements of the source processor location. That is, each target is a physical processor that is not in its optimal physical location based on processor type and machine configuration, as determined by a data structure maintained in internal storage.

Subsequent to creating the source and target processor lists, regardless of reason for reassignment, the source and target lists are saved, STEP 410. In one example, the source and target processor lists are saved in a common area of Hardware System Area storage, so that the lists are available to all of the processors in the system.

Subsequently, the configuration is updated, STEP 412. As an example, the processor configuration information in the Hardware System Area storage is updated to reflect the final configuration. This includes updating the physical to logical vectors, logical to physical vectors, and bit vectors per processor type (indicating the type, e.g., SAP, CPU, of the processor).

After the master determines a new configuration, each processor is to inspect the new physical processor assignments. One embodiment of this processing is described with reference to FIG. 5. Initially, a determination is made by the processor executing this logic whether it should leave its synchronization point, INQUIRY 500. If the processor has not been triggered to leave its synchronization point, then it remains. Otherwise, the processor fetches the source processor list from the Hardware System Area storage, STEP 502. The processor checks the list to determine whether it has been designated as a source processor, INQUIRY 504. If not, then processing for this processor is complete, and it reaches another synchronization point, STEP 506.

However, if the processor is designated as a source processor, then the processor stores its own operating state, referred to herein as Runit or micro-architected state, in the Hardware System Area storage, STEP 508. This operating state includes, for instance, the complete state of the processor, as visible by millicode. In one example, the storing is accomplished using a series of read Runit register and store instructions. Each register is read, by, for instance, an instruction, and the contents of the specified register are stored in a data structure in memory (e.g., Hardware System Area storage). Thereafter, it enters a synchronization point, STEP 506.

Subsequent to the processor storing the Runit state and entering another synchronization point, further processing is performed as described with reference to FIG. 6. In one embodiment, initially, a determination is made as to whether the processor should leave the synchronization point, INQUIRY 600. Each processor is triggered by the master as to when it can leave the synchronization point. The master triggers the processor to leave the synchronization state and to inspect the new physical processor assignments, subsequent to the sources storing their operating or micro-architected state. Until this point, the processor remains at the synchronization point. If it is determined that the processor is to leave the synchronization point, then it fetches the target processor list, STEP 602. The processor checks the list to determine whether it is designated as a target, INQUIRY 604. If the processor is a target processor, it updates the stored architected state, STEP 606. For example, the target processor determines the location in the Hardware System Area storage of the stored operating state of the source processor based on the target list which identifies the source for this target. It updates the stored operating state of the source processor to reflect the new physical processor. For example, it updates the processor unit number to reflect the target physical processor unit number.

Additionally, the target processor loads the stored architected state at the target, STEP 608. In one example, the target processor issues a Load R-Unit State instruction targeting the modified source processor's stored Runit state. The Load R-Unit state instruction executes in, for instance, millicode, and loads at the target processor the R-Unit registers of the corresponding source in a single, atomic operation. The registers are loaded, for instance, sequentially, a double-word at a time, starting at a storage location specified in the operand field of the load instruction. One embodiment of this instruction is described in U.S. Pat. No. 6,189,112 entitled "Transparent Processor Sparing," Slegel et al, issued on Feb. 13, 2001, which is hereby incorporated herein by reference in its entirety.

Thereafter, processing returns to a synchronization point, STEP 610. In response to all the processors returning to the synchronization point, the operation is complete and the master triggers all processors to return to normal operation. In one example, this includes a trigger to end the internal instruction.

Described in detail above is a capability for concurrently reassigning the physical backing of logical processors. The operating state of one physical processor is moved to another physical processor during operation of the physical processors (e.g., neither are in a failed, checkstopped, or clockstopped state). With this reassignment, the another physical processor is backing the logical processor. This may be accomplished for one or more processors of the environment.

One or more aspects of the present invention can be included in an article of manufacture (e.g., one or more computer program products) having, for instance, computer useable media. The media has therein, for instance, computer readable program code means of logic (e.g., instructions, code, commands, etc.) to provide and facilitate the capabilities of the present invention. The article of manufacture can be included as a part of a computer system or sold separately.

Figure 7:
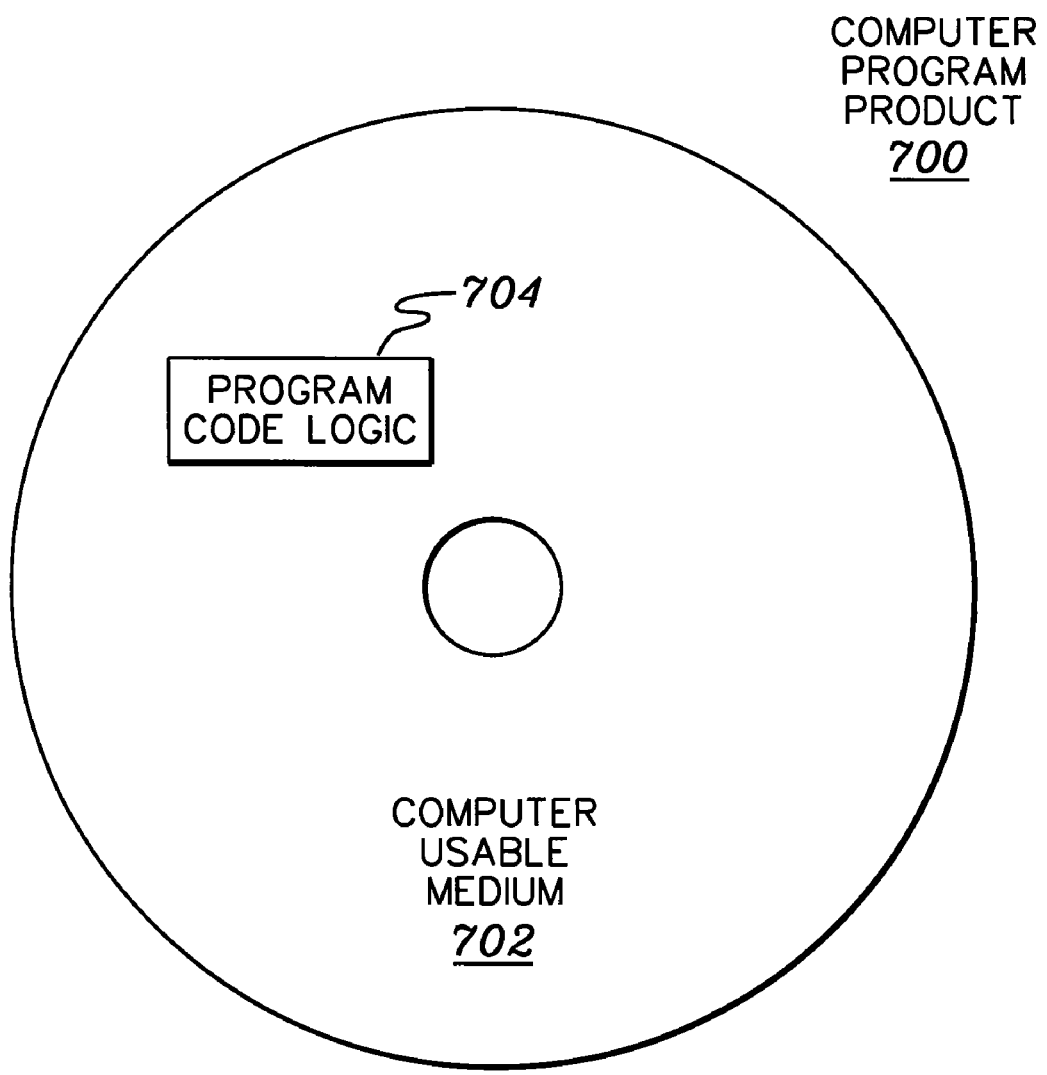
FIG. 7 depicts one embodiment of a computer program product incorporating one or more aspects of the present invention.

One example of an article of manufacture or a computer program product incorporating one or more aspects of the present invention is described with reference to FIG. 7. A computer program product 700 includes, for instance, one or more computer usable media 702 to store computer readable program code means or logic 704 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, the reassignment of the physical backing of logical processors is performed concurrently to the operation of the physical processors. That is, the processors need not be checkstopped, clock-stopped or in a fail mode in order to perform this reassignment. Additionally, the target processor need not be a spare processor. The reassignment is performed transparent to and without the involvement of software, including the operating system and/or the logical partition hypervisor. As one example, the reassignment is performed in millicode to provide certain performance enhancements. However, it can be performed in software, hardware, firmware or a combination thereof, in other embodiments.

Although various embodiments are described above, these are only examples. For instance, processing environments other than the one depicted and described herein may benefit from one or more aspects of the present invention. For example, there may be more or less processors than described herein, and the processors may be other than zSeries® processors. Further, the operating systems may be other than z/OS®, and the operating systems in the different processors can be the same or different from one another. Many other variations may be made to the processing environment without departing from the spirit of the present invention.

As further examples, although in the embodiment described herein, a swap of two processors is performed, this is only one example. The reassignment may be performed between more or less processors than described above. Also, in a further example, the master may be either a source or target or both. In yet further examples, although instructions are used to perform certain functions including invoking the reassignment, in other embodiments, these functions may be performed by other than instructions. Many other variations may exist without departing from the spirit of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of reassigning physical processors of a processing environment, said method comprising:
   determining that a physical processor backing a logical processor is to be changed; and
   reassigning to the logical processor another physical processor, wherein the reassigning is concurrent to operation of the physical processor, and wherein the reassigning comprises:
      determining a new configuration for the processing environment;
      employing the new configuration by the physical processor currently assigned to the logical processor to determine that it is to be replaced;
      storing by the physical processor operating state of the physical processor;
      checking the new configuration by the another physical processor to determine that the another physical processor is to be assigned to the logical processor; and
      loading on the another physical processor stored operating state of the physical processor.

2. The method of claim 1, wherein the reassigning is transparent to one or more operating systems of the physical processor and the another physical processor.

3. The method of claim 1, wherein the operating state comprises contents from at least one of the following of the physical processor:
   one or more general purpose registers, one or more access registers, one or more floating point registers, one or more control registers, one or more timing facility registers, one or more system configuration registers, and one or more instruction address registers.

4. The method of claim 1, wherein the reassigning is concurrent to operation of the physical processor and the another physical processor, wherein the physical processor and the another physical processor are not one of checkstopped, clock stopped or in fail mode, during the reassigning.

5. The method of claim 1, further comprising using, by the another physical processor, the new configuration to determine that it is the another physical processor that is to replace the physical processor.

6. The method of claim 5, wherein the loading comprises:
    determining a location in storage where the operating state of the physical processor is stored; and
    loading from the determined location the operating state of the physical processor.

7. The method of claim 6, wherein the loading further comprises updating the operating state of the physical processor to reflect a processor number of the another physical processor.

8. The method of claim 1, wherein the determining the new configuration comprises:

creating a source processor list comprising at least the physical processor to be reassigned; and
    creating a target processor list comprising at least the another physical processor to be used as the replacement, wherein the creating of the source processor list and the target processor list is dependent on a reason for the reassigning.

9. The method of claim 1, further comprising selecting a master processor of the processing environment to control the reassigning.

* * * * *